3,141,323
METHOD AND APPARATUS FOR THE SEPA-
RATION AND STORAGE OF FLUIDS BY
CHROMATOGRAPHY
Billy W. Taylor and Albert Anthony Poli, Jr., Pittsburgh,
Pa., assignors to Fisher Scientific Company, Pittsburgh,
Pa., a corporation of Pennsylvania
Filed Jan. 5, 1959, Ser. No. 785,075
7 Claims. (Cl. 73—23.1)

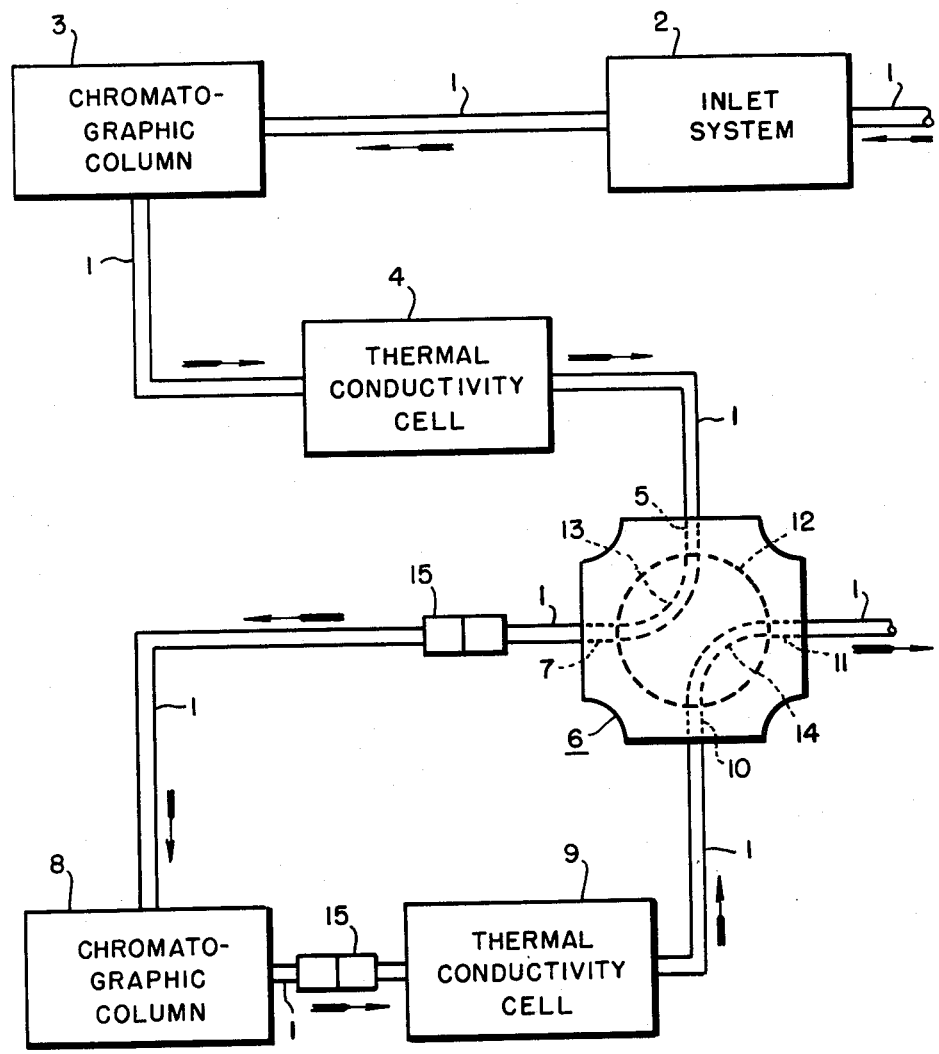

This application relates to method and apparatus for the separation and storage of fluids, particularly for the separation and storage of fluid substances which have heretofore been separated only extreme difficulty from mixtures of such substances having similar physical properties. When the fluids are at room temperature, they may be either liquids or gases.

Our method and apparatus also make possible the storage of such fluids in a more pure state than has heretofore been possible. Our method and apparatus also provide a convenient means for maintaining in a pure state fluids which can be prepared or separated with relatively little difficulty in accordance with known techniques.

Fluids so stored can be released at will in any quantity and for whatever purpose desired and at whatever rate desired. In the accompanying drawing, we show a block diagram of apparatus embodying and which may be used for carrying out our invention.

The apparatus comprises a conduit 1 which brings a carrier gas such as helium from a source, not shown, through an inlet system 2 and a first chromatographic column 3. The conduit 1 leads from the chromatographic column through a conventional thermal conductivity cell 4 to a first passage 5 in a four-way valve 6. The valve 6 also has a passage 7 and the conduit 1 connects this passage with a second chromatographic column 8. From the column 8, the conduit 1 leads through a second conventional thermal conductivity cell 9 to a third passage 10 in the valve 6. The valve 6 has a fourth passage 11 and the conduit 1 leads from this passage 11 to exhaust.

The valve 6 has a cylindrical valve member 12 in which two circular passages 13 and 14 are cut. When the valve member 12 is in the position shown in the drawing, the passages 5 and 7 are connected to each other, as also are the passages 10 and 11. When the valve member is turned 90 degrees in either direction, the passage 5 is connected to the passage 11 and the passage 7 is connected to the passage 10.

On either side of the second chromatographic column 8, the conduit 1 has couplings 15 whereby the chromatographic column 8 may be physically separated from the balance of the equipment. Preferably, "quick connect" couplings are used which may be easily separated and which also have a check valve which automatically closes one of the two parts of the coupling when the parts are separated. In this case, the check valve will be in the half of the coupling which is closest to the chromatographic column 8 so that, when the couplings are opened, the column is sealed by closing the ends of the portions of the conduit 1 which lead to and from the column. A suitable coupling is the "quick connect" coupling manufactured and sold by the Crawford Fitting Company of Cleveland, Ohio, under the trade name "Swagelok."

In accordance with known gas chromatography techniques, the nature of the chromatographic columns 3 and 8 is determined by the nature of the gases which are to be separated and stored in the apparatus. The columns may be absorption columns, such as silica gel and molecular sieve columns, or they may be partition columns. Such columns are described, for example, in our copending application, Serial No. 762,472, filed September 22, 1958, now Patent No. 3,097,518, issued July 16, 1963.

As noted, thermal conductivity cells are placed on the exit side of each of the chromatographic columns 3 and 8. These cells indicate the passage of gases through the columns and the conduit by sending an electrical signal to an indicating or recording instrument. If properly calibrated, the cells can also be used to indicate the quantities of various gases passing from the columns and through the conduit. Conductivity cells suitable for these purposes and the electrical circuits therefor are fully disclosed in our said copending application, Serial No. 762,472.

The inlet system 2 is used to insert into a carrier gas flowing through the conduit 1 fluid or fluid mixtures which are to be separated and stored in the apparatus. Such inlet systems are conventional.

The operation of our apparatus will now be described, using, first, specific examples of the separation and/or storage of gases. A typical example is the requirement that n-pentane be separated from a mixture of n-pentane and isopentane and the the n-pentane be stored in a pure state for future use. The separation and storage of n-pentane from such a mixture in accordance with heretofore known laboratory techniques has been extremely difficult.

A stream of carrier gas, preferably helium, is supplied through the conduit 1. The gas mixture in question is then injected into the flow of carrier gas at the inlet system. The gas mixture then flows into the first chromatographic column 3. This column is so designed that the rates at which n-pentane and isopentane flow through the column differ, the selection of the proper column being in accordance with known gas chromatography techniques, so that the isopentane first emerges from the column 3. The time when the isopentane emerges is indicated by the thermal conductivity cell 4 and the electrical signal which it sends to an indicating or recording instrument.

The valve member 12 of the valve 6 is positioned so that the passages 5 and 11 are connected, with the result that the isopentane flows out through the passage 1 to exhaust. After the isopentane has passed to exhaust, the valve member 12 is shifted so that the passage 5 is connected to the passage 7 and the n-pentane flows into the second chromatographic column 8. The valve member 12 is again shifted so that the passages 7 and 10 are connected. This closes off the chromatographic column from the rest of the system and the n-pentane remains in the column 8.

We have discovered that, so long as a carrier gas is no longer flowing through the column, a gas or a mixture of gases is not diffused through the column. It remains as a homogeneous mass within the column and it will remain so almost indefinitely.

If a supply of n-pentane is required, then a supply of carrier gas is introduced into the column 8, and this carrier gas will move out the n-pentane. Flowing of the n-pentane out of the column is indicated by the thermal conductivity cell 9. The rate at which the n-pentane flows out of the column can be regulated as desired by regulating the flow of the carrier gas. Any quantity desired can also be obtained by observing the signals from the thermal conductivity cell 9 and turning the valve member 12 so as to close off the column when the desired quantity has flowed out of the column 8.

Another example illustrating use of our apparatus is the problem of separating and storing oxygen, nitrogen, carbon monoxide, and methane from a mixture of gases including these four gases and in addition carbon dioxide and ethylene. A flow of helium carrier gas is started through the conduit 1 and is allowed to flow until the thermal conductivity cells have reached equilibrium, whereupon a sample of the entire mixture is injected into the carrier stream at the inlet system. The mixture then flows to the column 3. In accordance with known gas chromatography techniques, this column is a silica gel column in view of the nature of the gases in this particular mixture. Column 3 permits oxygen, nitrogen, carbon monoxide, and methane to flow through it at substantially the same rate. Carbon dioxide and ethylene flow through this column at slower rates. From column 3, the oxygen, nitrogen, carbon monoxide, and methane pass substantially as a group through the thermal conductivity cell 4, which sends an electric signal to an indicating or recording instrument to indicate the fact of their passing. The gases then flow through the four-way valve 6 and into the second chromatographic column 8. After these gases have passed the thermal conductivity cell and have entered the column 8, the valve 6 is turned so as to connect the passages 7 and 10 and thus close off the column 8 and connect the passages 5 and 11. When the carbon dioxide and ethylene leave column 3, they will then pass out through the passage 11 to exhaust.

Because the gases being separated and stored in this example are oxygen, nitrogen, carbon monoxide, and methane, the chromatographic column 8 is packed with a material which is known to be suitable for separating these gases. When a carrier gas flows in the column, the gases in question move through the column at different rates so that they can be withdrawn from this column one at a time whenever required. When the gases are required, the valve 6 is turned to the position shown, in which the passages 5 and 7 are connected and the passages 10 and 11 are connected. A flow of carrier gas then passes through the chromatographic column and the four gases, oxygen, nitrogen, carbon monoxide, and methane, emerge from the column in that order because of their differing rates of movement through the column. The time when each of the gases emerges from the column is indicated by the thermal conductivity cell 9 so that, after any particular gas is released, the valve 6 can be turned so as to close off the chromatographic column and retain the remainder of the gases.

If desired, after the four gases have entered the chromatographic column 8, it may be disconnected from the rest of the apparatus at the couplings 15 and the gases can then be stored indefinitely. We have found that there is no intermixing between the gases so long as there is no gas flow through the column. When the gases are required, the column can be connected up to a source of carrier gas and carrier gas flowed through the system to move the gases out of the column separately.

In the examples in the use of our apparatus which we have described up to this point, the separation and storage of substances which are gaseous at room temperature have been described. Our apparatus can also be used for the separation and storage of substances which are liquid at room temperature. Thus, a mixture of substances which are in liquid form at room temperature can be injected into the carrier gas in the inlet system as a liquid and heated to vaporize the liquids. The apparatus, including the columns, thermal conductivity cells, valve, and conduit, is maintained at a sufficiently high temperature that the liquid passes through the columns in the form of vapor.

It is not necessary to heat the liquids to their boiling points because the flow of carrier gas removes the vapor from the liquid surface as it is formed. Preferably, the liquids are heated to vapor form prior to their entry into the first chromatographic column so as to obtain a more efficient use of the column. It is possible to heat the liquids within the column, but if this is done a portion of the length of the column is used for vaporizing the materials rather than for separation.

One or more separate components of the mixture can be trapped in the second chromatographic column 8 as a vapor or vapors, in the same manner as components in the examples heretofore described were trapped. The column can then be disconnected from the balance of the apparatus and the components stored in the column for future use. It is not necessary to maintain the column after separation at a temperature above atmosphere so as to maintain the components in a gaseous stage. The column can be cooled to room temperature and the materials returned to their liquid form. When one or more of the components is desired, it or they can be removed from the chromatographic column by heating the column and connecting it to a source of carrier gas and the components contained therein removed from the column in the form of vapor.

While we have described certain presently preferred embodiments of our invention, it is to be understood that it may be otherwise embodied within the scope of the appended claims.

We claim:

1. Apparatus for the separation and storage of fluids, comprising a first chromatographic column, a second chromatographic column, a conduit for supplying a flow of carrier gas to the first column, a conduit for carrying said flow from the first column to the second column, means for injecting a fluid sample into the carrier gas in advance of the first column, a valve in the conduit between said columns, a conduit connecting the outlet end of the second column and said valve, said valve having passageways connected to said columns whereby, depending on the setting of the valve, gas may flow from said first column to said second column and from said second column to exhaust, or gas may flow from said first column to exhaust and the flow of gas through the second column may be cut off.

2. Apparatus for the separation and storage of fluids as described in claim 1 and having a thermal conductivity cell connected in said conduit between said first column and said valve.

3. Apparatus for the separation and storage of fluids as described in claim 1 and having a thermal conductivity cell connected in said conduit between said second column and said valve.

4. Apparatus for the collection and storage of fluids as described in claim 1 and having means for connecting and disconnecting the second column from the valve and means for closing the ends of the second column when it is disconnected from said valve.

5. Apparatus for the separation and storage of fluids, comprising a conduit for the flow of gases, means for injecting a fluid sample into gas flowing through the conduit, a first chromatographic column, a gas conduit leading from said sample injecting means to said first column, a four-way valve, a gas conduit leading from said first column to a first passage in said valve, a second chromatographic column, a conduit leading from a second passage in said valve to said second column, a third passage in said valve, a conduit leading from said second column to said third passage, a fourth passage in said valve leading to exhaust, and means for connecting said first and second passages and said third and fourth passages whereby gas may flow from the first column to the second column and through the second column to exhaust and for connecting said first and fourth passages and said second and third passages whereby gas may flow from said first column to exhaust and the flow of gas to and from the second column is cut off.

6. A method for separating and storing a fluid which comprises flowing an inert carrier gas through a chromatographic column, injecting a fluid mixture containing the fluid to be stored into said carrier gas in advance of said column, separating the fluid to be stored from the balance of the fluid mixture, flowing the carrier gas and said fluid to be stored into a second chromatographic column, and closing the ends of said second column after the fluid to be stored has entered said second column.

7. Apparatus for the separation and storage of fluids, comprising a first chromatographic column in the form of a tube and a packing therein, a second chromatographic column in the form of a tube and a packing therein different from the packing in the first column, a conduit for supplying a flow of carrier gas to said first column, a conduit for carrying said flow from the first column to the second column, means for injecting a fluid sample into the carrier gas in advance of the first column, a valve in the conduit between said columns, a conduit connecting the outlet end of said second column and the valve, said valve having passageways connected to said columns whereby, depending on the setting of the valve, gas may flow from said first column to said second column and from said second column to exhaust, or gas may flow from said first column to exhaust and the flow of gas through the second column may be cut off.

References Cited in the file of this patent

UNITED STATES PATENTS

| | | |
|---|---|---|
| 2,699,837 | Van Note | Jan. 18, 1955 |
| 2,868,011 | Coggeshall | Jan. 13, 1959 |
| 3,068,686 | Harmon | Dec. 18, 1962 |